United States Patent [19]

Mather et al.

[11] Patent Number: 5,386,371
[45] Date of Patent: Jan. 31, 1995

[54] PORTABLE EXPLOITATION AND CONTROL SYSTEM

[75] Inventors: Mike Mather, Vadnais Heights; Steve Haumersen, Crystal; Roger Eastey, Minneapolis, all of Minn.

[73] Assignee: Hughes Training, Inc., Arlington, Tex.

[21] Appl. No.: 278,684

[22] Filed: Jul. 21, 1994

Related U.S. Application Data

[63] Continuation of Ser. No. 856,791, Mar. 24, 1992, abandoned.

[51] Int. Cl.⁶ .............................................. G06F 13/00
[52] U.S. Cl. .............................. 364/571.08; 364/579; 364/550
[58] Field of Search ................ 364/550, 188, 571.08, 364/579

[56] References Cited

U.S. PATENT DOCUMENTS

| | | | |
|---|---|---|---|
| 4,294,496 | 10/1981 | Murez | 312/208 |
| 4,841,456 | 6/1989 | Hogan, Jr. et al. | 364/550 |
| 4,868,755 | 9/1989 | McNulty et al. | 364/424.01 |
| 4,893,240 | 1/1990 | Karkouti | 364/424.05 |
| 4,931,950 | 6/1990 | Isle et al. | 364/188 |
| 5,014,218 | 5/1991 | Crain et al. | 364/502 |

FOREIGN PATENT DOCUMENTS 0460867 12/1991
8803327 5/1988 Germany.

*Primary Examiner*—Emanuel T. Voeltz
*Assistant Examiner*—Thomas Peeso
*Attorney, Agent, or Firm*—W. K. Denson-Low

[57] ABSTRACT

A multi-purpose portable system PECOS (10) is provided having capabilities which allow an operator (16) to perform system operations which include control, exploitation, testing and training for remote systems. The PECOS (10) has a portable housing (30) which encloses the system. Included in the PECOS (10) is a user interface (12) for allowing an operator (16) to interface therewith. Memory (60) is provided for storing application software (14) having control commands which correspond to a plurality of possible remote systems. A processor (58) is further provided for processing the control commands in response to the operator inputs.

21 Claims, 5 Drawing Sheets

PORTABLE EXPLOITATION AND CONTROL SYSTEM

This is a continuation of application Ser. No. 07/856,791 filed Mar. 24, 1992 now abandoned.

BACKGROUND OF THE INVENTION

1. Technical Field

This invention relates to stand-alone computer systems and, more particularly, to a portable multi-purpose system for handling applications such as control, exploitation, training and testing of military systems.

2. Discussion

Military or defense systems and the like generally require some type of computer control system for providing communication with or control of the system. Systems which generally require such control include unmanned vehicle control, mission planning, sensor control, and other various intelligence/electronic warfare and weapons systems functions. Such computer control systems enable operators to communicate with the system for purposes of controlling or testing the system. In addition, systems such as these may be used for purposes of exploiting or training an operator on how to operate a system.

Conventional computer control systems have been developed for providing control of such systems. However, conventional computer control systems are generally large and made up of a number of separate work stations. As a result, such conventional computer control systems generally are expensive to set up in the field and typically require several operators. In addition these conventional systems are relatively more difficult to operate and require significantly more operator training. In addition, conventional computer control systems are usually designed to control specific operations for a single system and therefore require significant and expensive changes in hardware and software in order to change from the operation of one system to another.

Portable computer control systems have been developed for handling specific operations involving individual systems. However, to the best of applicant's knowledge, such portable computer control systems generally have not provided the level of performance and functionality of the conventional full size work stations. In addition, the ability of most conventional portable control systems to handle functions for operating various systems have been limited to a few operations for a single remote system.

It is therefore desirable to obtain a portable, inexpensive, multi-purpose system for providing testing and control for a plurality of systems. In particular, it is desirable to provide for control, exploitation, training and testing of defense and remote communications systems. In addition, it is further desirable to obtain such a portable system which may operate any number of systems without requiring significant modifications. Furthermore, it is desirable to obtain such a portable system that is easy to operate and offers comparable performance and functionality of larger non-portable work stations.

SUMMARY OF THE INVENTION

In accordance with the teachings of the present invention, a portable multi-purpose system is provided having capabilities which include control, exploitation, testing and simulation of a system or the like. In the preferred embodiment, the system is enclosed within a portable housing, The system has a user interface for allowing an operator to interface with the system, The system includes designated commands which are stored in a memory for providing desired system operations in response to operator input control signals. A processor is further provided for receiving and processing the operator control signals in accordance with the control commands so as to provide control output signals for controlling the desired system operations. Application software is provided to enable reconfiguration of the portable system so that interface and control with a number of systems is possible.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
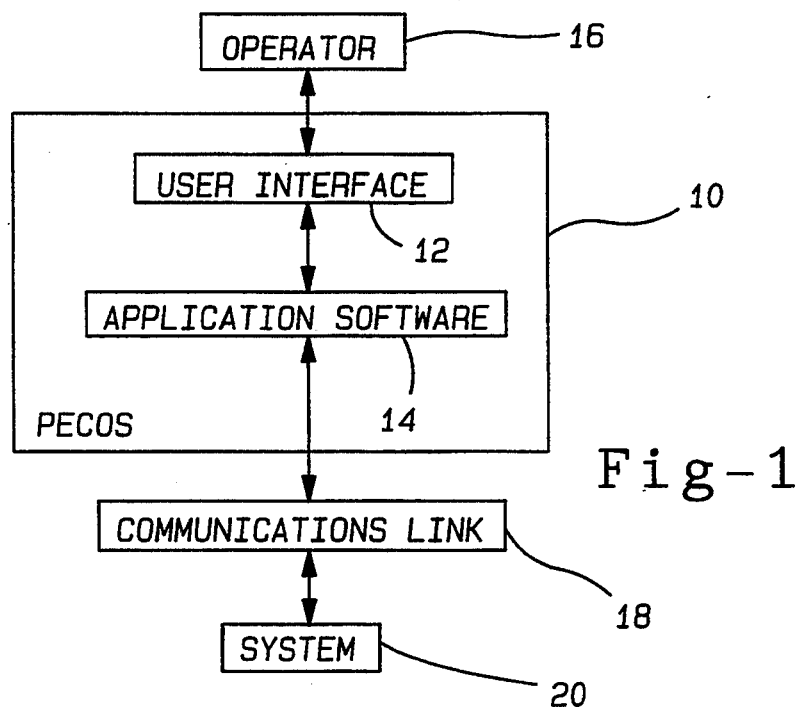
FIG. 1 is a block diagram which illustrates the use of a portable exploitation and control system for controlling system operations in accordance with the present invention.

Turning now to FIG. 1, the use of a portable exploitation and control system (PECOS) 10 having training and testing capabilities is shown therein for providing a number of system operations. The PECOS 10 is a portable multi-purpose stand-alone computer system that enables a user to perform a wide variety of system operations. The PECOS 10 is designed so that a user may easily transport the PECOS 10 to a desired location to perform system control and exploitation, testing, training and other such applications for military or communications purposes and the like. The PECOS 10 may provide control signals to a system or receive data therefrom and exploit, e.g. to use the received data to provide for a desired application such as target tracking or imagery.

The PECOS 10 includes a user interface 12 for allowing a single user or operator 16 to interface therewith. The user interface 12 receives operator inputs via an operator input device. The preferred embodiment employs an operator input device with "point and click" direct manipulation of objects which are displayed as graphical, iconic representations of functions. The graphical representations of functions are then converted by the user interface 12 to control signals that may be processed by the PECOS 10.

The PECOS 10 further includes application software 14 which is preferably loaded and stored within a memory location in the PECOS 10. However, the application software 14 may be stored and loaded from an external device if desired. The application software 14 provides designated control commands which function to provide desired system operations. Such applications may include the control and exploitation of a system. In addition, the application software 14 may further provide for simulation of a system and thereby allow an operator 16 to train for operating a system. The application software 14 further allows for testing and development operations amongst other possible applications.

The PECOS 10 performs the designated system operation in accordance with each specific software application 14 in response to control signals provided by an operator 16 via the user interface 12. The PECOS 10 may perform these various system operations for any one of a plurality of systems without the need for any significant modifications to the PECOS 10. For the most part, the PECOS 10 is designed to provide for additional system operations by easily loading an additional software application 14.

The PECOS 10 is shown connected to a remote system 20 via a communication link 18. The remote system 20 may include an unmanned vehicle, sensor controls, and other various intelligence/electronic warfare and weapons systems amongst other possible system applications. As such, an operator 16 may use the PECOS 10 to provide control and exploitation of the remote system 20. Such control and exploitation functions may include mission planning for an unmanned vehicle, target tracking, imagery, and other possible applications such as those shown in FIG. 6.

Figure 6:
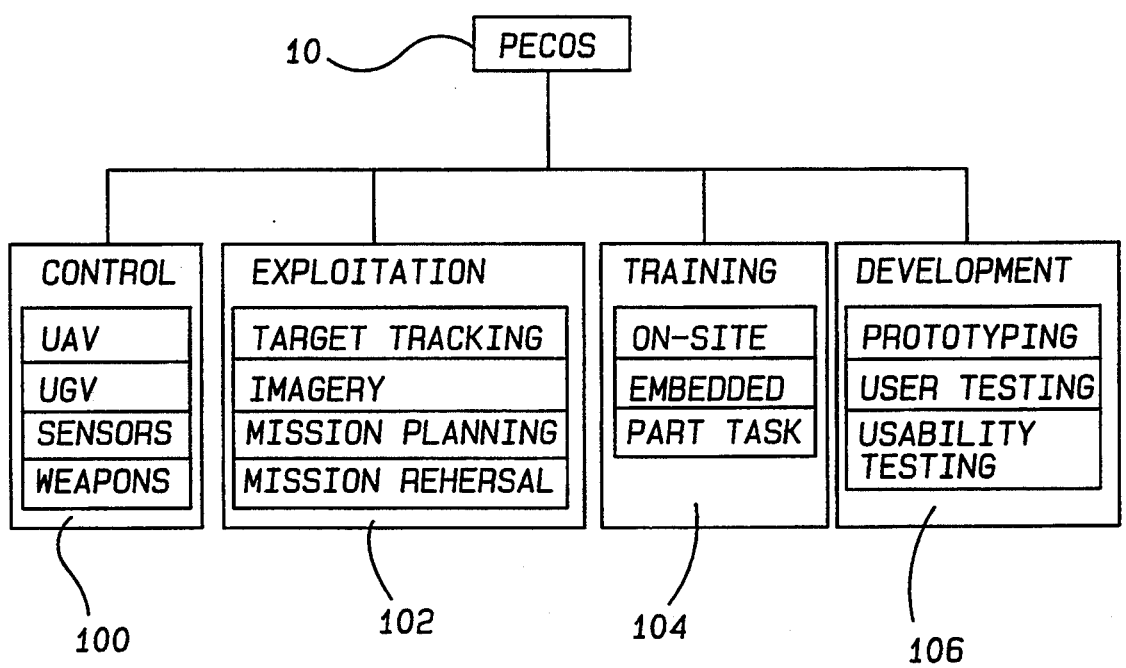
FIG. 6 is a block diagram which illustrates examples of system operations that may be performed with the portable exploitation and control system in accordance with the present invention.

For purposes of training an operator 16 to perform system operations, the PECOS 10 generally would not require connection to a remote system 20. Instead, a simulation of the system may be provided for by the application software 14. In doing so, the simulation provides the operator 16 with information representative of an actual system. As such, the operator inputs may be processed in accordance with realistic simulation data to provide an operator 16 with training information. In addition, the PECOS 10 may further be employed for development purposes such as providing prototyping, user testing and usability testing as shown in FIG. 6. As such, an operator 16 may transport the PECOS 10 to the desired system 20 or communication link 18 and perform testing or prototyping therewith.

Figure 2A:
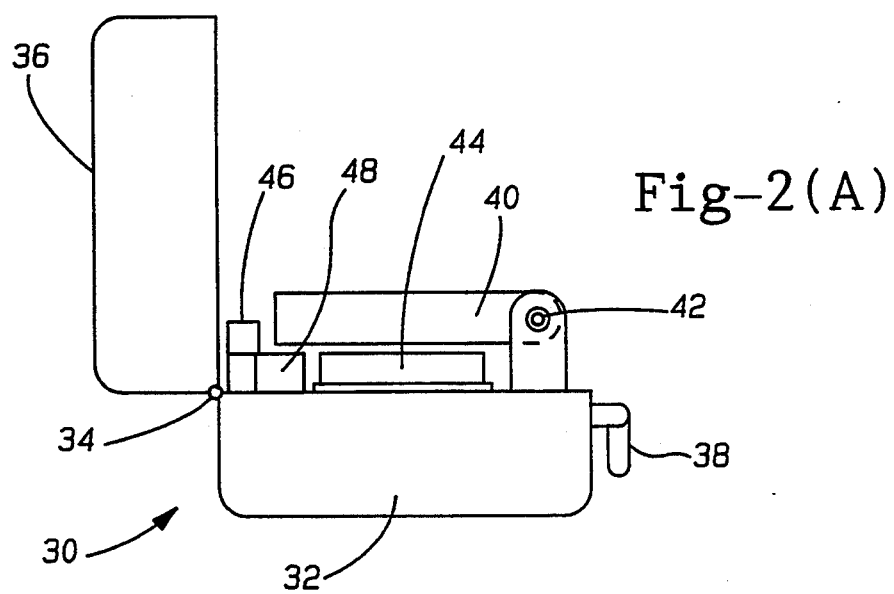
FIG. 2(A) is a side view of a portable exploitation and control system stowed in a portable enclosure.
Figure 2B:
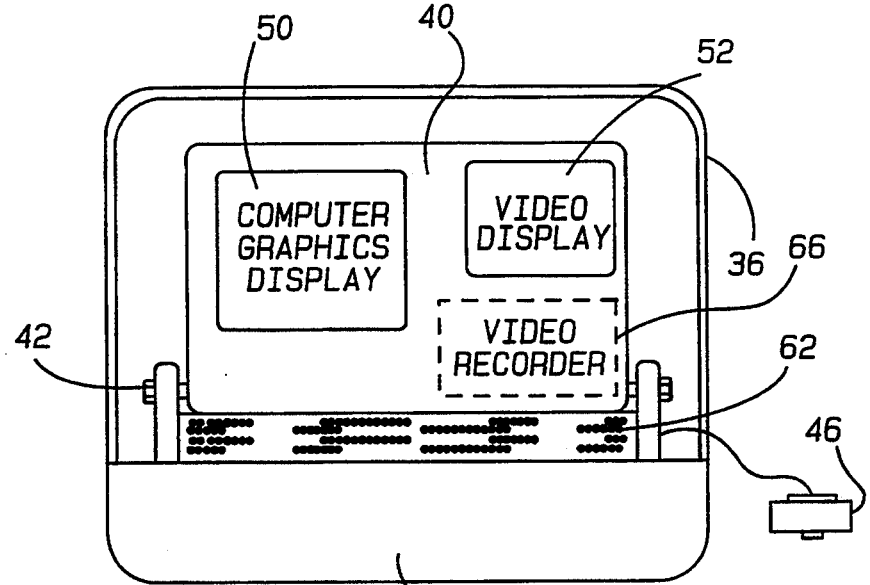
FIG. 2(B) a front view of a portable exploitation and control system ready for use in accordance with the present invention.
Figure 2C:
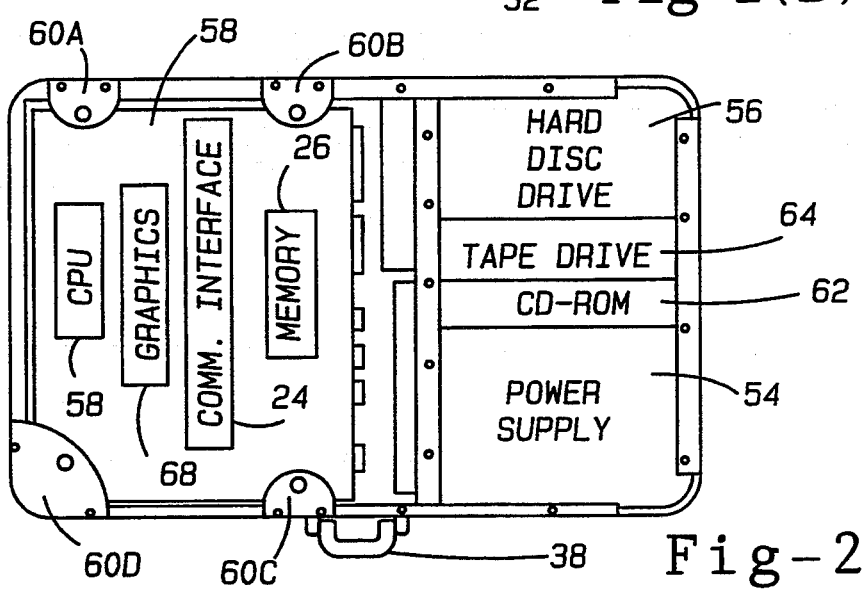
FIG. 2(C) is a top view of the bottom portion of the portable enclosure which illustrates the hardware mounted therein in accordance with the preferred embodiment of the present invention.

The preferred embodiment of the PECOS 10 is shown in FIGS. 2(A) through 2(C). The preferred embodiment of the PECOS 10 includes a rugged suitcase type of enclosure 30 having a bottom portion 32 and a top portion 36. The top and bottom portions 32 and 36 are connected via a hinge 32. The top portion 36 may be pivoted about the hinge 32 relative to the bottom portion 32 so as to open (as shown) and close the enclosure 30. The enclosure 30 further includes a handle 38 connected to the outside of the enclosure 30 which allows for ease in transporting the PECOS 10. The PECOS 10 weighs approximately 60 pounds and is small enough for an average sized operator to single handedly transport the PECOS 10 to a desired location.

Mounted within the enclosure 30 are a plurality of hardware components which include a tip-up flat panel housing 40. The flat panel housing 40 is connected to the enclosure 30 via a hinge 42 which thereby allows the flat panel housing 40 to pivot thereon and extend vertically therefrom. The flat panel housing 40 has a computer graphics display 50 and a video display 52 mounted therein. The computer graphics display 50 provides graphical representations of system functions and other user interface information. The video display 52 provides a color display of sensor data from the system being operated. As such, the video display 52 may receive a signal from a remote video sensor such as forward looking infrared (FLIR) or camera (not shown). In addition a video recorder 66 may be included as an option for recording the events occurring on the video display 52. The addition of the video recorder 66 would allow for replay of sensor data for exploitation or training operations.

A mouse 46 is provided as an operator input device for interfacing with the computer graphics display 50. The operator 16 may use the mouse 46 to manipulate the graphical representations via a "point and click" technique. A keyboard 44 may be provided as an optional operator input device. In addition, a fan housing 48 is provided which includes two cooling fans for blowing warm air out of the enclosure 30 to prevent overheating therein. In doing so, the PECOS 10 receives air from the exterior via air inlets 62. The various hardware components of the PECOS 10 may be stowed in the enclosure 30 as shown in stowed configurations in FIG. 2(A) or rearranged and stowed in any number of ways.

FIG. 2(B) illustrates a front view of the PECOS 10 with the top portion 36 of the enclosure 30 opened and the flat panel housing 40 extended. The flat panel housing 40 with the computer graphics display 50 and the video display 52 are positioned so as to face the operator 16. The back side of the flat panel housing 40 contains various electronics boards as well as controls and input jacks connected thereto.

FIG. 2(C) is a top view of the bottom portion 32 of the enclosure 30 which essentially houses the power, processing and memory hardware. A power supply 54 is mounted in the bottom portion 32 of the enclosure 30 for providing power to the PECOS 10. A hard drive 56 is also mounted to the bottom portion 32 for providing memory storage therein. The hard drive 56 is preferably a one Gigabyte, 3½ inch removable hard drive. A tape drive 64 is provided in the bottom portion 32 which provides additional memory. A compact disc-read only memory (CD-ROM) 62 is further provided in the bottom portion 32 for further providing data access. A computer system 58 is shock mounted to the bottom portion 32 of the enclosure 30. The computer system 58 is a standard off-the-shelf computer system such as that manufactured by Silicon Graphics having a Model No. 4D/35. The computer system 58 includes a card cage and backplane which has a number of computer boards mounted therein which provide for a central processing unit (CPU) 58, a graphical processing unit 68, a communications interface 24 and memory 26. The computer system 58 is mounted to the bottom portion 32 of the enclosure 30 via four separate shock mounts 60a through 60d. The four separate shock mounts 60a through 60d provide shock absorption so as to prevent damage or interruption of the operation of the PECOS 10 during adverse conditions.

Figure 2D:
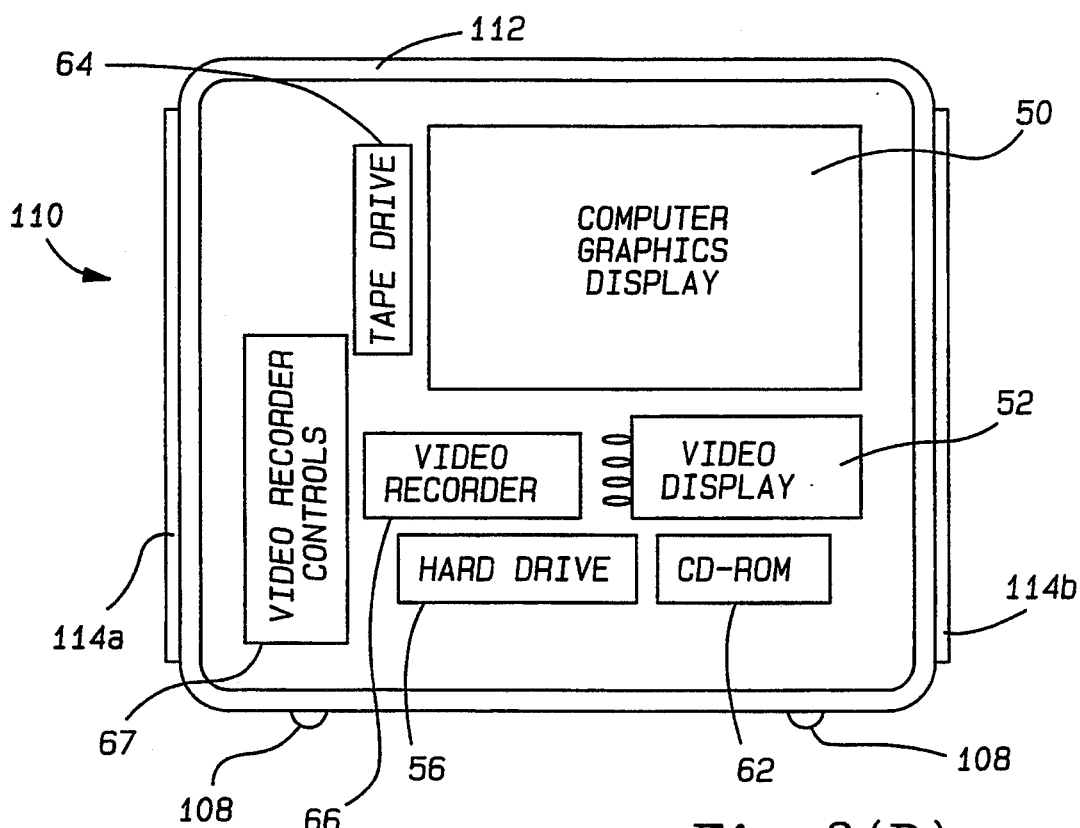
FIG. 2(D) is a front view of a portable exploitation and control system that is adapted to be desk top or rack mounted, in accordance with an alternate embodiment of the present invention.
Figure 2E:
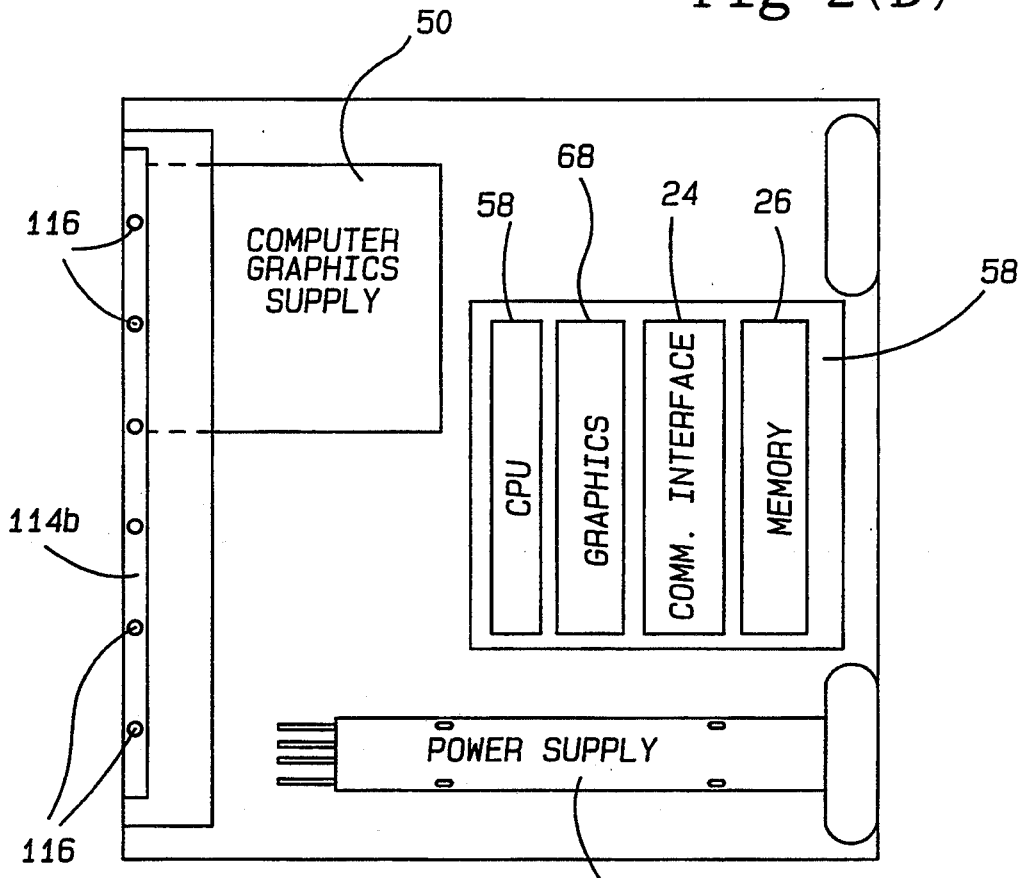
FIG. 2(E) is a side view of the desk top or rack mounted portable exploitation and control system shown in FIG. 2(D) in accordance with the alternate embodiment of the present invention.

An alternate embodiment of the present invention is illustrated in FIGS. 2(D) and 2(E). The alternate embodiment of the PECOS 10 is a rack mount/desk top unit 110. The rack mount/desk top PECOS 110 includes a portable enclosure 112 that may be positioned or mounted on a desk top or a rack. The alternate embodiment of the PECOS 110 includes, essentially the same hardware and is capable of performing the same system operations as the preferred embodiment. However, the hardware is mounted and positioned as a single unit with the hardware arranged in a different manner.

Figure 3:
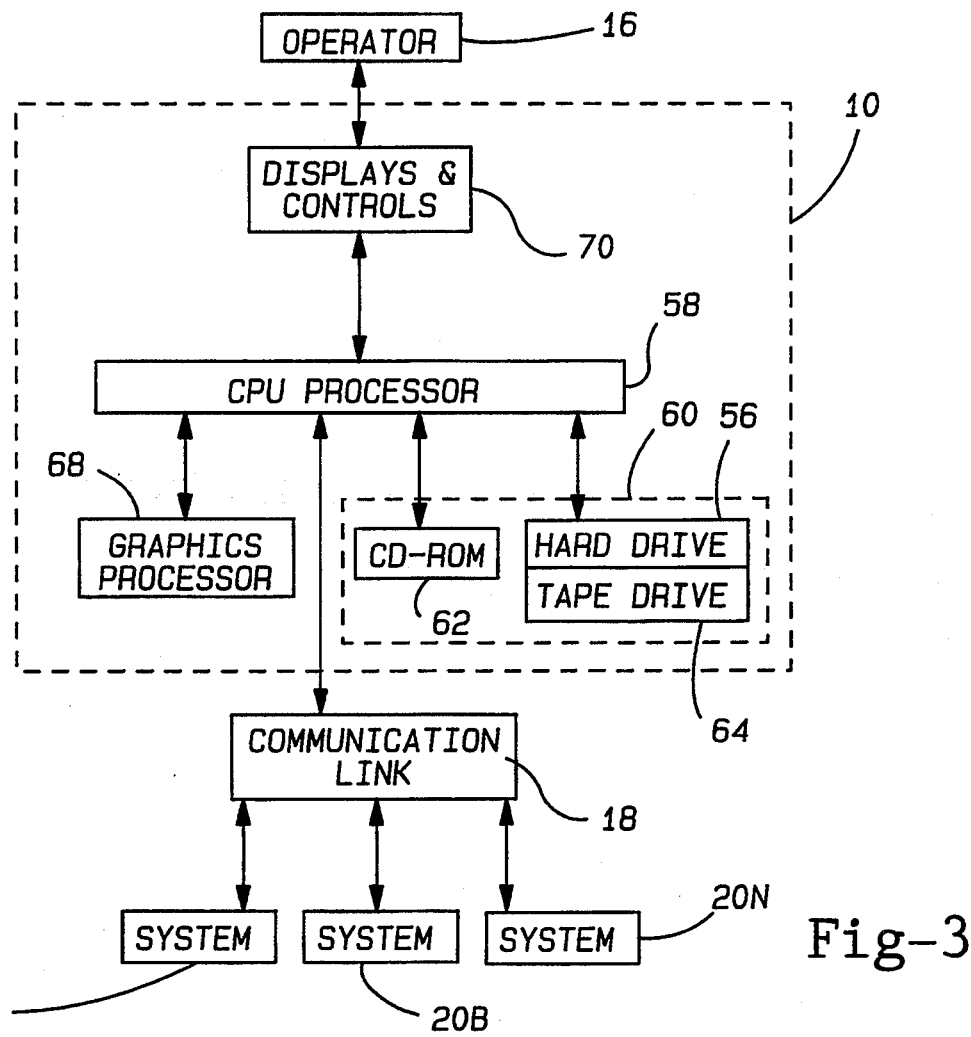
FIG. 3 is a block diagram which illustrates the hardware for the portable exploitation and control system as shown in FIGS. 2A–2E.

The rack mount/desk top embodiment of the PECOS 110 includes a plurality of short legs 108 connected on the bottom side of the enclosure 112. The short legs 108 allow the alternate embodiment of the PECOS 110 to be placed on top of a desk, a rack or other desired surface. The rack mount/desk top embodiment of the PECOS 110 further includes a pair of mounting brackets 114a and 114b which facilitate for use in a standard nineteen inch equipment rack. The mounting racks 114a and 114b have a plurality of openings 116 therein which allow for the PECOS 110 to be bolted or otherwise connected to a rack. FIG. 3 illustrates a block diagram of the PECOS 10 connected between an operator 16 and one of a plurality of systems 20a through 20n via the communication link 18. The PECOS 10 includes a central processing unit 58 for providing general processing of the control commands and for further providing other general processing functions. The PECOS 10 further includes memory storage 60 which may include a compact disk read only memory (CD-ROM) 62, a hard drive 66 and a tape drive 64. The hard drive 66 stores information such as the application software 14 and user interface software. The central processing unit 58 communicates with the memory storage 60 so that the system operations may be processed in response to desired control inputs received from an operator 16. In addition, the PECOS 10 includes a graphics processor 68 which communicates with the central processing unit for providing graphics processing. Furthermore, the PECOS 10 includes displays and controls 70 for providing a user interface mechanism which allows the operator 16 to interface with the PECOS 10.

Figure 4:
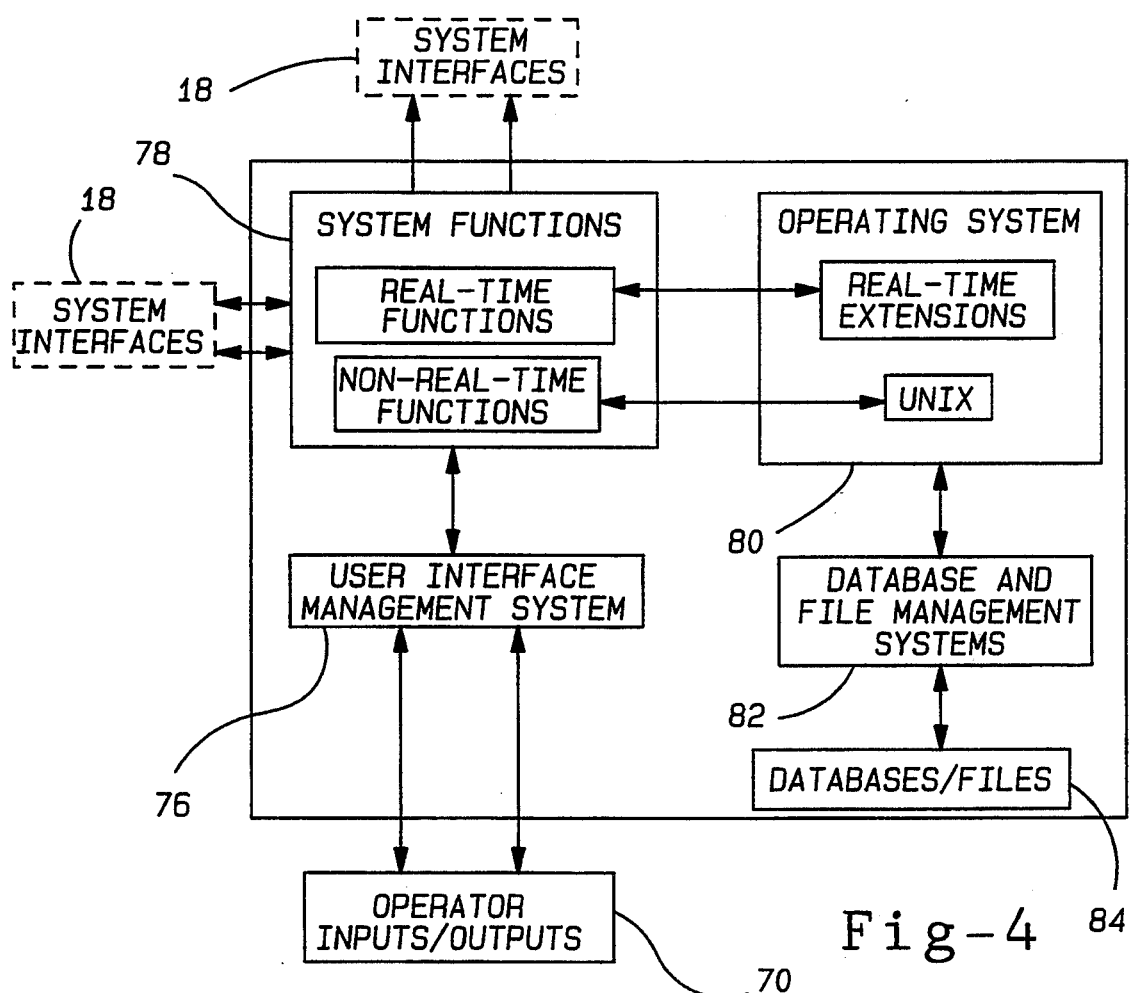
FIG. 4 is a block diagram which illustrates high-level processes of the portable exploitation and control system.

FIG. 4 is a block diagram which illustrates the processing of system functions in accordance with the PECOS 10. The PECOS 10 is capable of processing real-time system functions and nonreal-time system functions. In doing so, the central processing unit 58 provides operating system 80 which communicates with systems functions 78 for processing thereof. The system functions may be processed in either real-time or nonreal time. As such, the operating system 80 includes a UNIX and a real-time extension which communicates with database and file management systems 82. In addition, data is stored in database/files 84 which further communicates with the database and file management systems 82.

Figure 5:
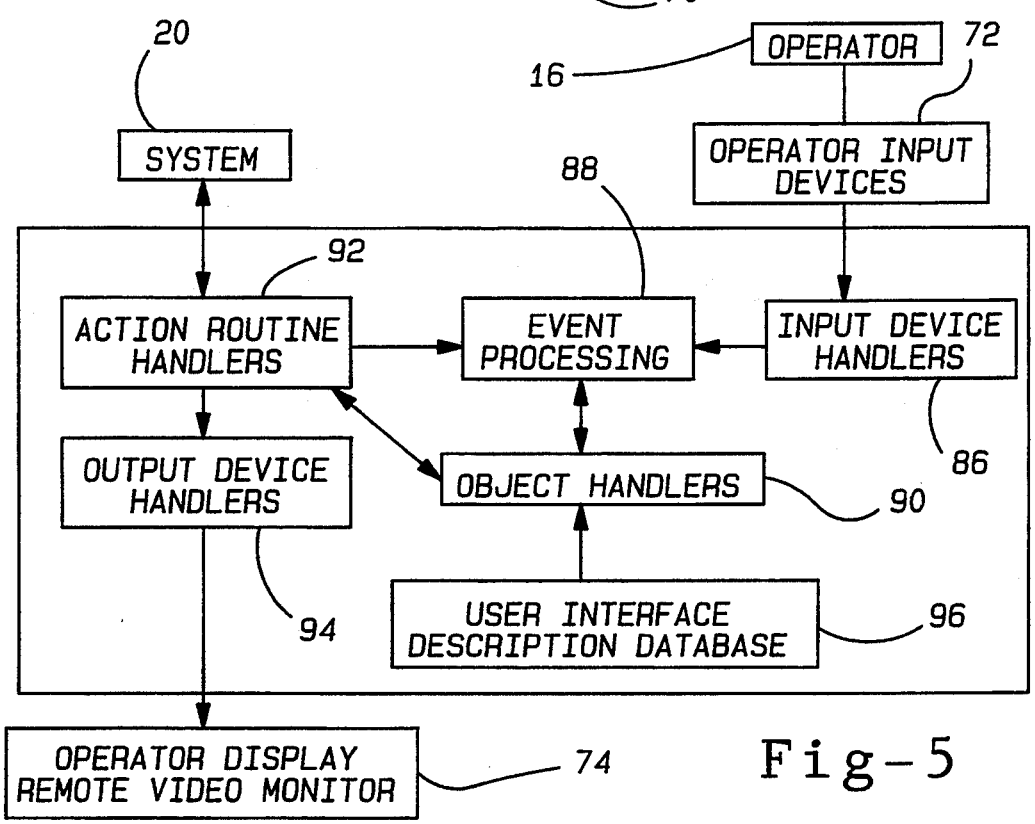
FIG. 5 is a flow diagram which illustrates the user interface management processing for the portable exploitation and control system.

FIG. 5 is a flow diagram which illustrates operating events which occur with the PECOS 10. In operation, an operator 16 inputs chosen commands via an operator input device 72 such as a mouse 46 and the computer graphics display 50. The operator inputs are converted from graphical representations to input signals. The input signals are received by the PECOS via input device handlers 86. The input device handlers 86 transmit the input signals to event processing algorithms 88. The event processing algorithms 88 further receive an input from action routine handlers 92 and further communicates with object handlers 90. The object handlers 90 receive information from a user interface description database 96 and further communicate with the action routine handlers 92. The action routine handlers 92 thereby provide an output signal to a remote system 20. In addition, output device handlers 92 may also provide an output signal to an operator display 74 or other remote video monitor via output device handlers 94.

FIG. 6 illustrates examples of some of the system operations that may be provided for with the PECOS 10. The PECOS 10 may act as a control system 100 for controlling an unmanned aerial vehicle (UAV), an unmanned ground vehicle (UGV), sensor controls, weapons system amongst other types of systems. The PECOS 10 may also provide for exploitation operations 102 such as target tracking, imagery, mission planning or mission rehearsal. In addition, the PECOS 10 may allow an operator to perform various training operations 104 such as on-site training, embedded training or part-task training. In doing so, the PECOS 10 generally provides for simulation of the system on which an operator is being trained and thereby uses the simulation data to provide for comparative results. Furthermore, the PECOS 10 may be used for purposes of providing development operations 106 such as prototyping, user testing and usability testing.

Thus, while this invention has been disclosed herein in connection with a particular example thereof, no limitation is intended thereby except as defined by the following claims. This is because the skilled practitioner will recognize that other modifications can be made without departing from the spirit of this invention after studying the specification and drawings.

What is claimed is:

1. A portable multi-purpose system for handling system operations which include control, exploitation, training and test of a remote system, said portable system comprising:

user interface means for receiving operator inputs and providing output operator control signals to allow an operator to interface with said portable system;

memory means for storing designated control commands which provide for desired system operations for a predetermined remote system in response to said output operator control signals;

processing means connected to said user interface means for receiving said output operator control signals and processing said output operator control signals and said control commands to control said predetermined remote system operation, wherein said processing means performs control and exploitation of the remote system; and portable housing means for enclosing and providing carriage of said user interface, memory and processing means.

2. The system as defined in claim 1 wherein said portable housing means comprises:

a bottom compartment containing said memory means and said processing means including a central processing unit and a graphics processor;

a pivoting lid connected to said bottom compartment for opening and closing said portable housing means; and a handle for allowing an operator to easily transport said portable system.

3. The system as defined in claim 2 wherein said user interface means comprises:

display means including a pivoting graphics display for providing graphical representations which are representative of operating functions.

4. The system as defined in claim 3 wherein said user interface means further comprises:

means for allowing said operator to select desired operating functions; and means for converting said selected desired operating functions to said operator output control signals.

5. The system as defined in claim 4 wherein said portable system may be operated by a single operator.

6. The system as defined in claim 1 further comprising communication means for providing control output signals to said remote system and for receiving information from said predetermined remote system.

7. The system as defined in claim 1 wherein said portable system may control any one of a plurality of remote systems by selecting the control commands for the desired system.

8. The system as defined in claim 7 wherein said remote system operations comprise military system operations.

9. The system as defined in claim 1 wherein said system further comprises:

simulation means for simulating a desired system operation wherein said output operator control signals are processed in conjunction with said simulation means so as to allow for system testing or training therewith.

10. A portable control system for remotely controlling system operations of one of a plurality of remote systems, said portable control system comprising:

a portable housing means having support means for supporting said portable control system, said portable housing means enclosing:

a) user interface means for allowing an operator to communicate with said portable control system, said user interface means receiving operator inputs and providing as an output operator control signals in response to said operator inputs;

b) memory means for storing designated control commands which provide designated system operations in response to said output operator control signals for controlling said one of the plurality of remote system operations; and c) processing means for receiving said output operator control signals from said user interface means, said processing means processing said output operator control signals in accordance with said designated control commands so as to provide control output signals for controlling said one of the plurality of remote system operations and performing exploitation of said remote system.

11. The system as defined in claim 10 wherein said portable housing means comprises a single unit enclosure that is adapted to be transported and mounted to a desktop or a rack.

12. The system as defined in claim 10 wherein said control output signals from said processing means are transmitted to said one of the plurality of remote systems via a communication means, and said portable control system is further adapted to control each of the plurality of remote systems without substantial changes thereto.

13. The system as defined in claim 10 wherein said support means comprises a plurality of legs connected to the bottom side of said portable housing means for allowing said portable control system to contact a surface therewith.

14. The system as defined in claim 10 wherein said support means comprises at least one bracket for mounting said portable control system on a rack.

15. The system as defined in claim 10 wherein said user interface means comprises:

display means for providing graphical representations which are representative of operating functions;

means for allowing said operator to select desired operating functions; and means for converting said desired operating functions to said output operator control signals.

16. The control system as defined in claim 10 wherein said portable control system is used to perform test operations.

17. A method for providing control, exploitation, testing and simulation of a subject system, said method comprising;

enclosing a multi-purpose system within a portable housing, said multi-purpose system including a user interface, memory and processor;

transporting said multi-purpose system via said portable housing to a desired location which is suitable for an operator to use said multi-purpose system;

receiving operator inputs via said user interface;

storing control commands in said memory wherein said control commands provide desired system operations for a predetermined subject system in response to operator inputs; and processing said control commands in response to said operator inputs so as to provide control output signals for providing desired system operations which includes control and exploitation of said predetermined subject system.

18. The method as defined in claim 17 further comprising the step of providing said control output signals to a subject system for control or exploitation thereof.

19. The method as defined in claim 17 further comprising the steps of:

simulating the operation of a desired subject system; and operating said multi-purpose system in conjunction with said simulation so as to allow for testing or training in the operation and control.

20. A portable multi-purpose system for handling system operations which include control, exploitation, training and testing of a remote system, said portable system comprising:

user interface means for receiving operator inputs and providing output operator control signals to allow an operator to interface with said portable system;

memory means for storing designated control commands which provide for desired system operations for a predetermined remote system in response to said output operator control signals;

processing means connected to said user interface means for receiving said output operator control signals and processing said output operator control signals and said control commands to control said predetermined remote system operation;

portable housing means for enclosing and providing carriage of said user interface, memory and processing means; and communication means for providing control output signals to said predetermined remote system and for receiving information from said predetermined remote system, wherein said system operations comprise military system operations for performing control and exploitation of said remote system.

21. The system as defined in claim 20 further comprising simulation means for simulating a desired system operation wherein said output operator control signals are processed in conjunction with said simulation means so as to allow for system testing and training therewith.

* * * * *